(12) United States Patent
Lin et al.

(10) Patent No.: US 10,302,179 B2
(45) Date of Patent: May 28, 2019

(54) SWITCHING APPARATUS FOR A DRIVING SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kao-Hung Lin, New Taipei (TW); Ping-Yi Chen, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 125 days.

(21) Appl. No.: 15/486,439

(22) Filed: Apr. 13, 2017

(65) Prior Publication Data

US 2018/0172119 A1 Jun. 21, 2018

(30) Foreign Application Priority Data

Dec. 21, 2016 (CN) .......................... 2016 1 1189579

(51) Int. Cl.
*F16H 19/00* (2006.01)
*F16H 25/18* (2006.01)
*F16H 57/08* (2006.01)
*F16H 19/04* (2006.01)
*F16H 7/02* (2006.01)
*F16H 35/00* (2006.01)

(52) U.S. Cl.
CPC ............. *F16H 19/001* (2013.01); *F16H 7/02* (2013.01); *F16H 19/04* (2013.01); *F16H 25/18* (2013.01); *F16H 57/08* (2013.01); *F16H 2035/006* (2013.01)

(58) Field of Classification Search
CPC .......... F16H 7/02; F16H 19/001; F16H 19/04; F16H 25/18; F16H 57/08; F16H 2035/066
See application file for complete search history.

(56) References Cited

U.S. PATENT DOCUMENTS 5,365,301 A * 11/1994 Sugita .................. G03B 17/425
396/144

* cited by examiner

*Primary Examiner* — Mark J Beauchaine
(74) *Attorney, Agent, or Firm* — ScienBiziP, P.C.

(57) ABSTRACT

A switching apparatus for a driving system includes a motor, a first function unit, a second function unit and a power switching unit. The power switching unit includes a planetary gear set connected to the motor and driven by the motor and a swinging mechanism connected to the planetary gear set and driven by the planetary gear set. The power switching unit is switchable between a first position, where the power switching unit is drivingly connected to the first function unit, and a second position, where the power switching unit is drivingly connected to the second function unit.

17 Claims, 7 Drawing Sheets

SWITCHING APPARATUS FOR A DRIVING SYSTEM

FIELD

The subject matter herein generally relates to a switching apparatus for a driving system.

BACKGROUND

A multi-function device, such as an office all-in-one inkjet printer, usually includes several functions. Each of the several functions is driven by an individual driving system. However, these functions are not usually working at same time in most cases, a driving system can thus be shared. Therefore, a switching apparatus for a driving system would be beneficial.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIGS. 1 to 7 illustrate a switching apparatus 1 in three exemplary embodiments, for a driving system. The switching apparatus 1 can include a base 50, a motor 10 mounted on the base 50, a first function unit, a second function unit, and a power switching unit 40. In the driving system, the first function unit and the second function unit cannot work at same time. When one of the first function unit and the second function unit is not working, the power switching unit 40 can deliver the power of the motor 10 to the other one, so that the motor 10 can be shared by the first function unit and the second function unit.

The first function unit and the second function unit will be described in embodiments below.

In FIGS. 1, 3, 5, 6, and 7, the input gear 4101 is partially shown.

In a first exemplary embodiment, FIGS. 1 to 4 illustrate a switching apparatus 1, the switching apparatus 1 can be used in a driving system.

The switching apparatus 1 includes a base 50, a motor 10 mounted on the base 50, a first function unit, a second function unit (not shown) and a power switching unit 40. The first function unit is a first rack mechanism 20a.

The power switching unit 40 can include a planetary gear set 410 connected to the motor 10 and a swinging arm 420 connected to the planetary gear set 410. The planetary gear set 410 is driven by the motor 10 and the swinging arm 420 is driven by the planetary gear set 410.

Figure 1:
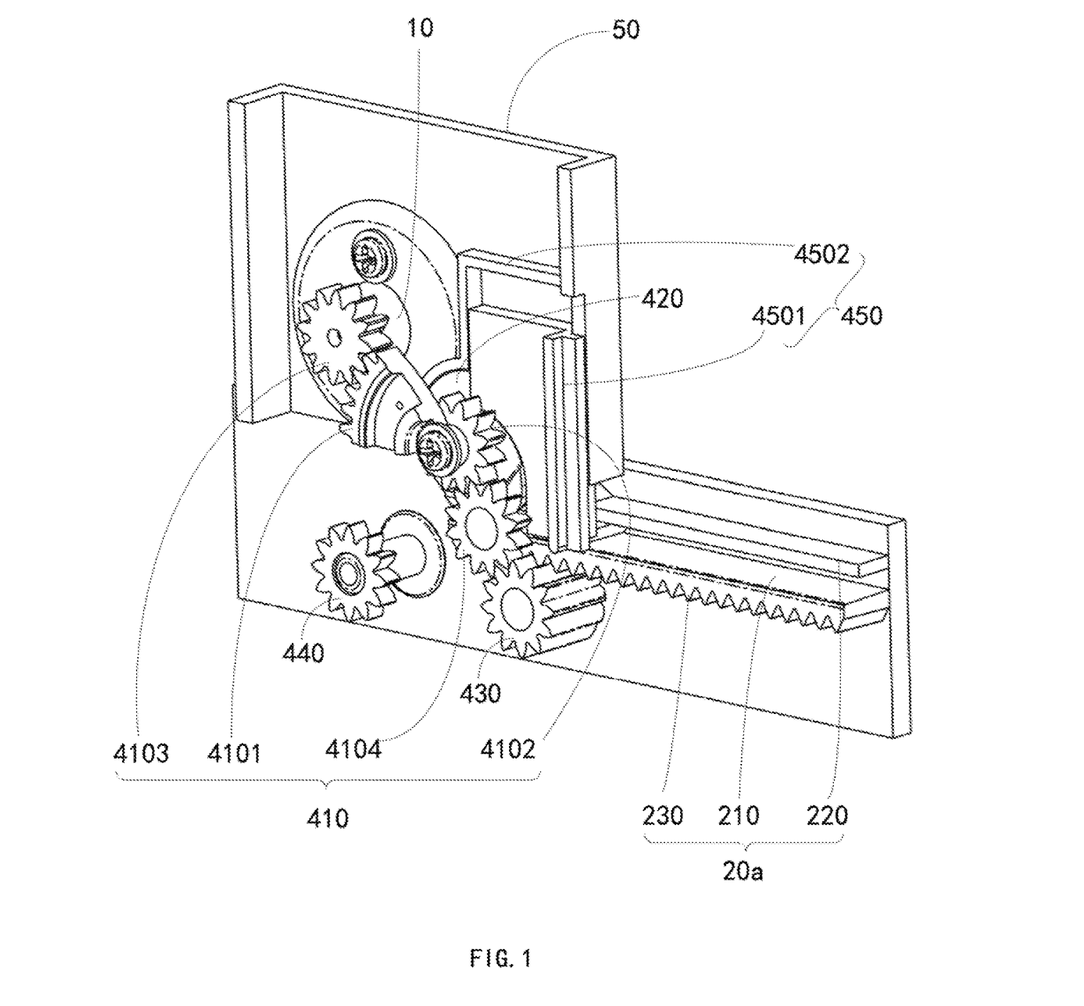
FIG. 1 is an isometric view of a first exemplary embodiment of a switching apparatus for a driving system.
Figure 2:
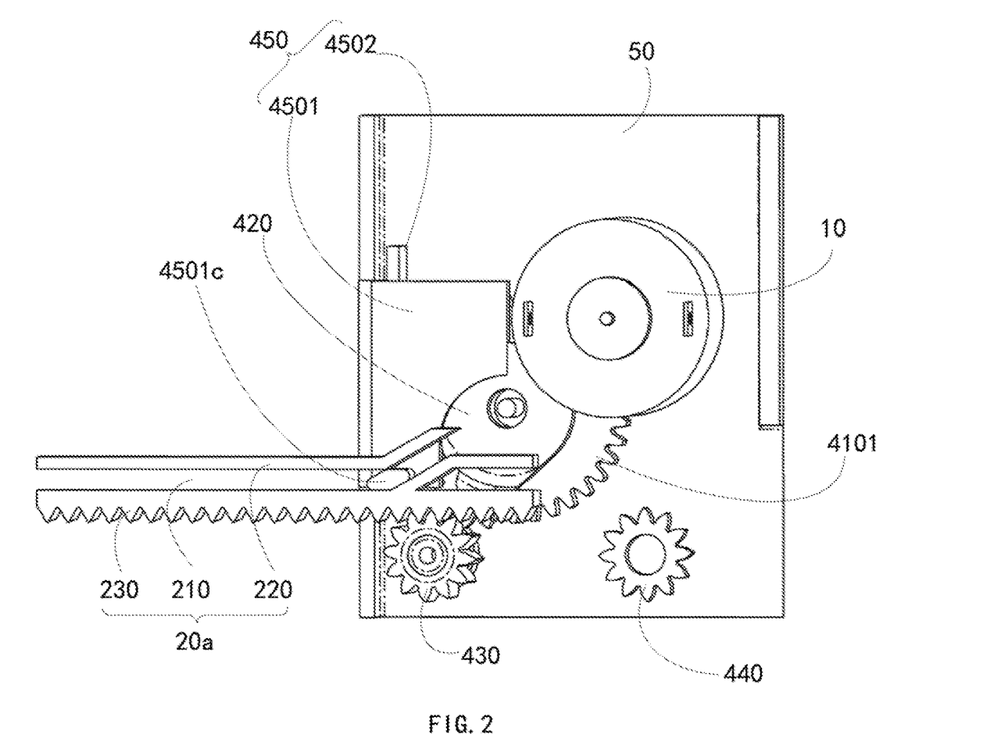
FIG. 2 is an rear view of the switching apparatus of FIG. 1.
Figure 3:
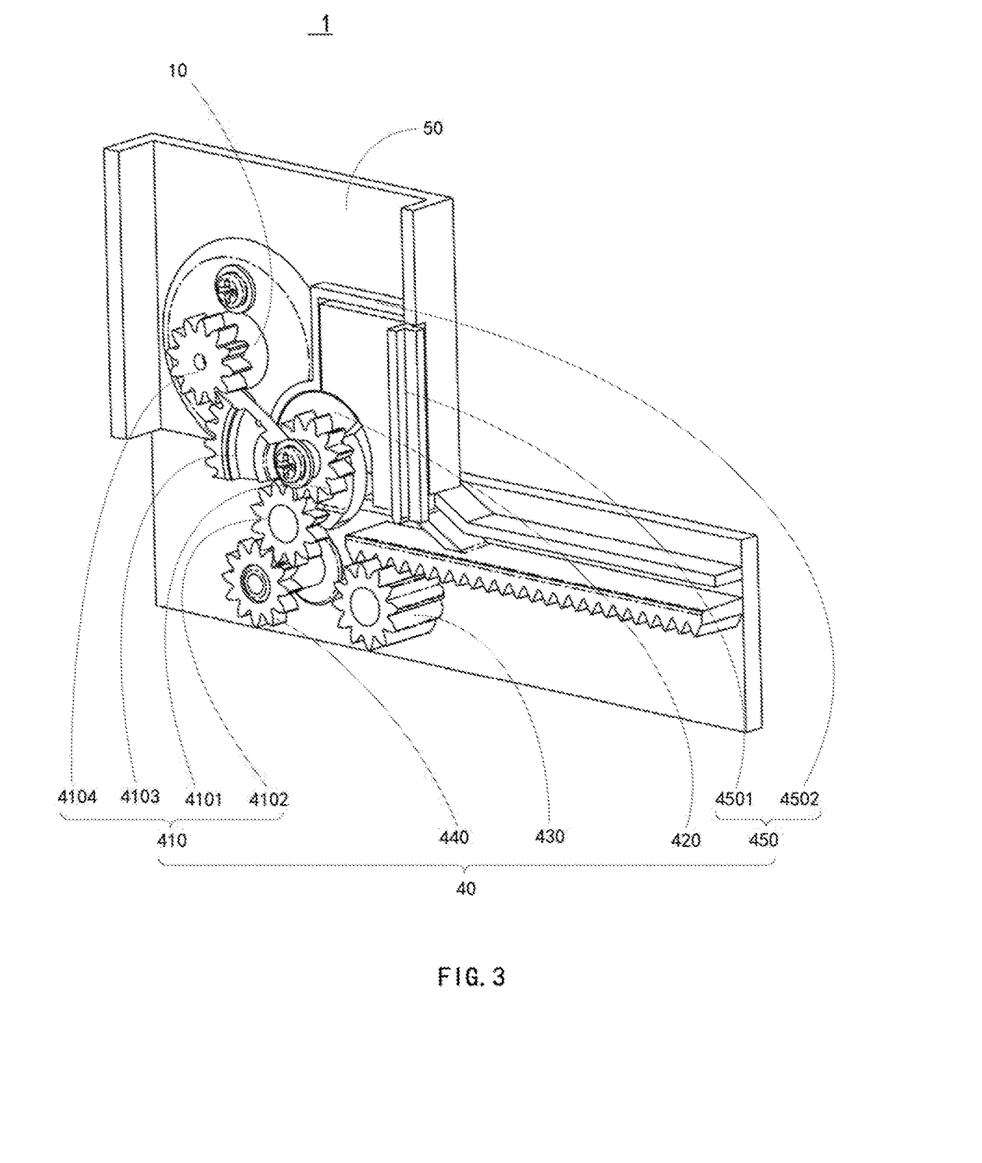
FIG. 3 is an isometric view of the switching apparatus of FIG. 1 in another state.

The power switching unit 40 is switchable between a first position, as shown in FIGS. 1-2, where the power switching unit 40 is drivingly connected to the first rack mechanism 20a, and a second position, as shown in FIG. 3, where the power switching unit 40 is drivingly connected to the second function unit.

The planetary gear set 410 can include an input gear 4101 driven by the motor 10, a driving gear 4102 coaxially fixed to the input gear 4101, a planetary gear 4104 meshed with the driving gear 4102, and a motor gear 4103 coaxially fixed to an output shaft (not shown) of the motor 10. The driving gear 4102 is drivingly connected to the swinging arm 420.

The swinging mechanism includes a swinging arm 420 and the swinging arm 420 includes a connecting end and a free end. The connecting end is connected to the input gear 4101. The planetary gear 4101 is rotatably connected to the free end of the swinging arm 420, the planetary gear 4104 meshes with the driving gear 4102.

When the input gear 4101 is driven by the motor 10, the swinging arm 420 is driven to swing by the input gear 4101, and the planetary gear 4104 is switched between the first position and the second position.

The power switching unit can further include a first output gear 430 drivingly connected to the first rack mechanism 20a and a second output gear 440 drivingly connected to the second function unit.

The first output gear 430 is rotatably mounted to the first position and the second output gear 440 is rotatably mounted to the second position. When the planetary gear 4104 is switched to the first position, the planetary gear 4104 meshes with the first output gear 430. When the planetary gear 440 is switched to the second position, the planetary gear 4104 meshes with the second output gear 440.

The first rack mechanism 20a can be a reciprocating mechanism, the switching apparatus 1 can further include a swinging arm holder 450. The swinging arm holder 450 is driven by the first rack mechanism 20a.

When the motor 10 rotates in a forward direction, the swinging arm 420 is driven to swing in the forward direction. The planetary gear 4104 is thereby switched to the first position and the first rack mechanism 20a drives the swinging arm holder 450 to hold the swinging arm 420. When the motor 10 rotates in a backward direction, the first rack mechanism 20a drives the swinging arm holder 450 to release the swinging arm 420. The swinging arm 420 is thereby driven to swing in the backward direction, and the planetary gear 4104 is switched to the second position.

Figure 4:
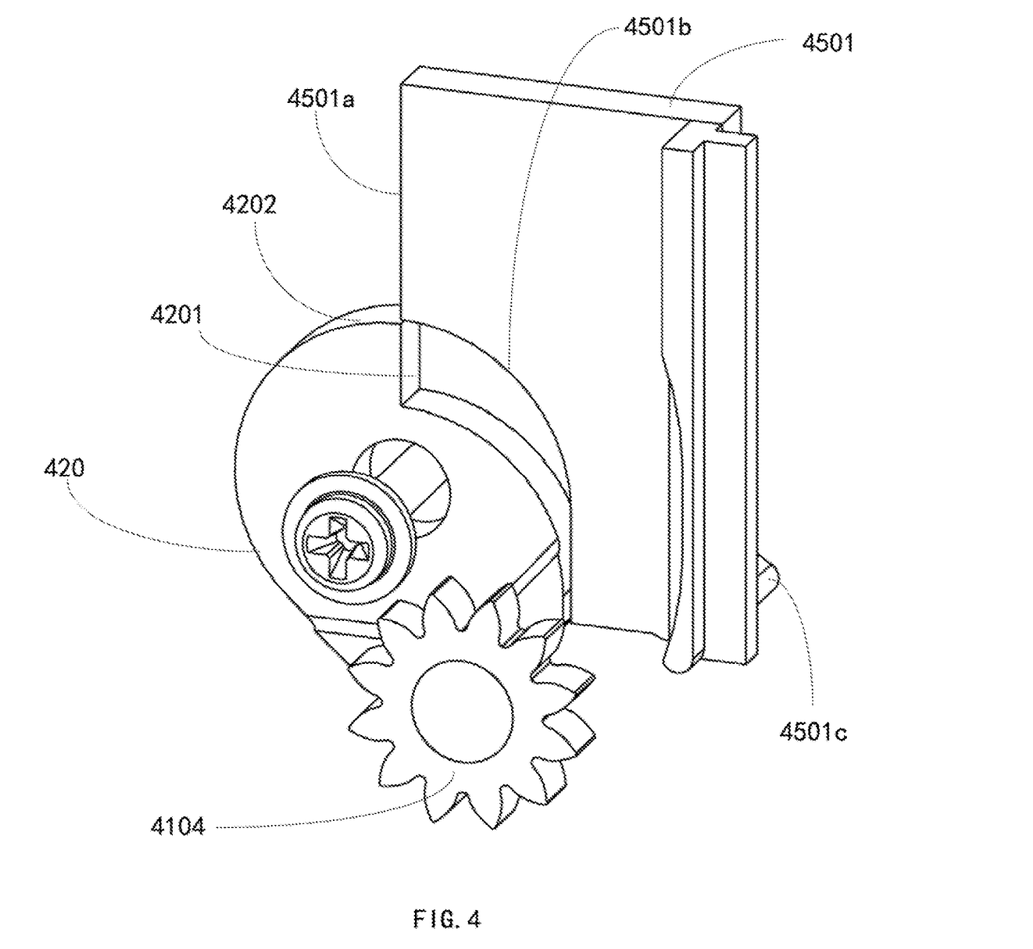
FIG. 4 is an isometric view of the swinging arm and the swinging arm holder in the switching apparatus of FIG. 1.

The swinging arm holder 450 can include a first locking block 4501, the first locking block 4501 defines a first locking path 4501a and a first unlocking path 4501b. The swinging arm 420 can define a second locking path 4201 and a second unlocking path 4202. Second locking path 4201 corresponds to the first locking path 4501a and second unlocking path 4202 corresponds to the first unlocking path 4501b. The first locking block 4501 is driven by the first rack mechanism 20a.

When the motor 10 rotates in a forward direction, the swinging arm 420 is driven to swing in the forward direction. The planetary gear 4104 is thereby switched to the first position, and the first rack mechanism 20a drives the first locking path 4501a on the first locking block 4501 to join with the second locking path 4201. The first locking block 450 holds the swinging arm 420.

When the motor 10 rotates in a backward direction, the first rack mechanism 20a drives the first locking path 4501a to separate from the second locking path 4201 and the first unlocking path 4501b to join with the second unlocking path 4202. The first locking block 4501 releases the swinging arm 420.

The swinging arm 420 can be a disk cam. A peripheral surface of the disk cam includes a first locking surface and a first unlocking surface. A peripheral surface of the first locking block 4501 includes a second locking surface and a second unlocking surface.

When the motor 10 rotates in a forward direction, the swinging arm 420 is driven to swing in the forward direction, and the planetary gear 4104 is switched to the first position. The first rack mechanism 20a drives the first locking surface to join with the second locking surface, and the first locking block 4501 holds the swinging arm 420.

When the motor 10 rotates in a backward direction, the first rack mechanism 20a drives the first locking surface to separate from the second locking surface and the first unlocking surface, to join with the second unlocking surface. The first locking block 4501 releases the swinging arm 420.

The first rack mechanism 20a can include a first chassis 220, and a first rack 230. The first rack 230 meshes with the first output gear 430.

The first sliding groove 210 is defined on the first chassis 220, and the first rack 230 is fixed to the first chassis 220.

The first locking surface is on top of the disk cam, and the second locking surface is on top of the first locking block 4501. The first rack mechanism 20a defines a first sliding groove 210 inclined towards moving direction of the first rack mechanism 20a. The first locking block 4501 includes a first sliding portion 4501c, the first sliding portion 4501c being slidably received in the first sliding groove 210.

When the planetary gear 4104 is switched to the first position, the first sliding groove 210 drives the first locking block 4501 to move down through the first sliding portion 4501c, and the first locking surface joins with the second locking surface. The first locking block 4501 holds the swinging arm 420.

When the planetary gear 4104 is switched from the first position to the second position, the first sliding groove 210 drives the first locking block 4501 to move up through the first sliding portion 4501c. The first locking surface thus separates from the second locking surface and the first unlocking surface joins with the second unlocking surface, so the first locking block 4501 releases the swinging arm 420.

Figure 5:
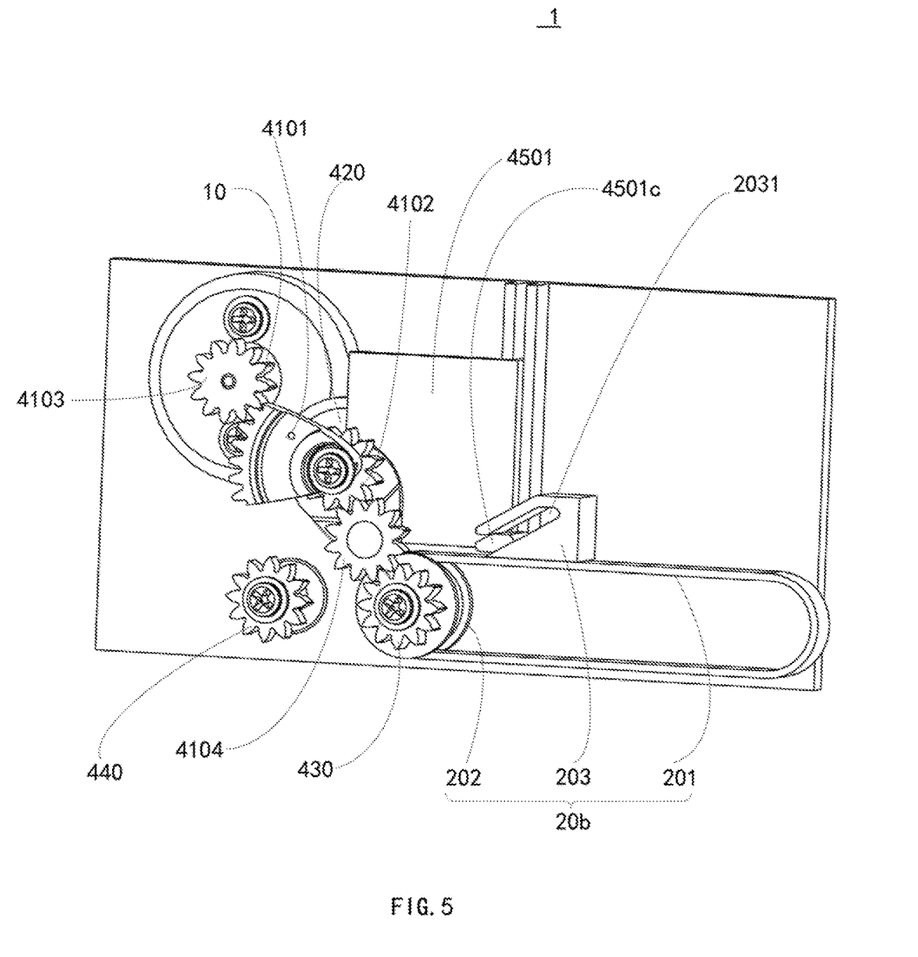
FIG. 5 is an isometric view of a second exemplary embodiment of a switching apparatus for a driving system.
Figure 6:
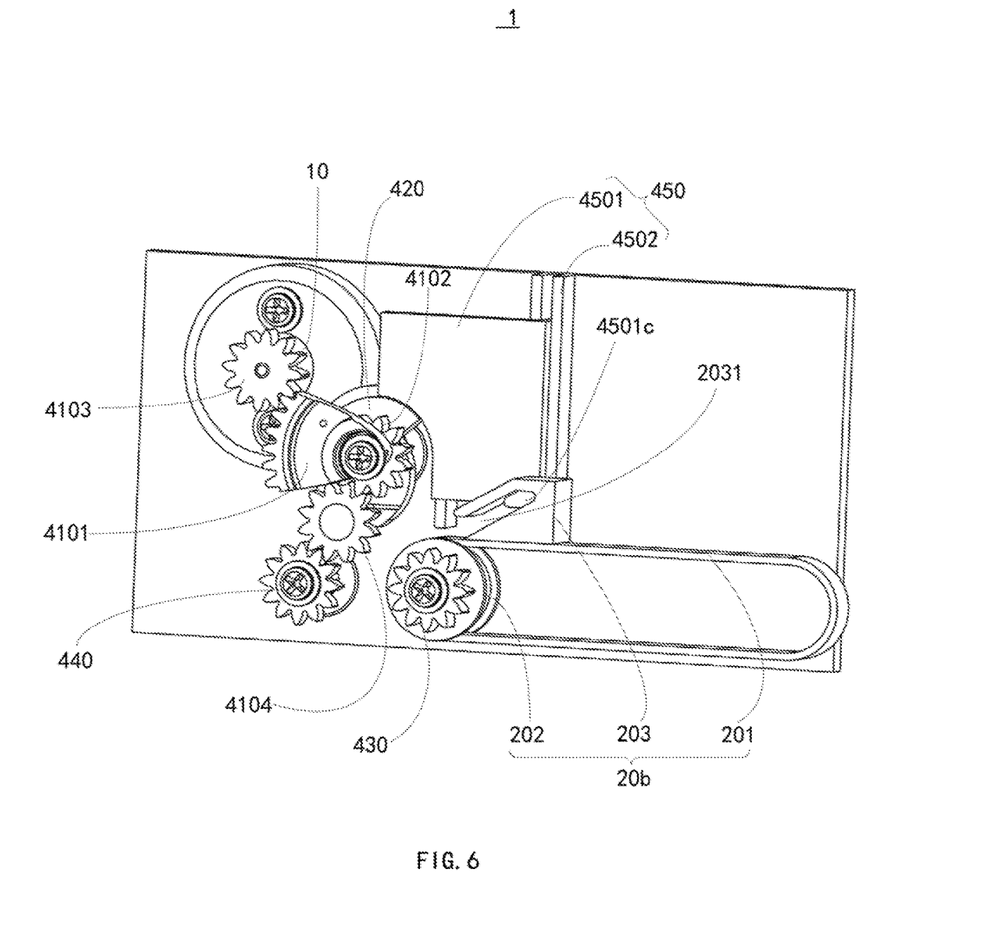
FIG. 6 is an isometric view of the switching apparatus of FIG. 5 in another state.

A second exemplary embodiment is presented, the difference between the second exemplary embodiment and the first exemplary embodiment is that in the second exemplary embodiment, the first function unit is a belt mechanism 20b. The motor 10, the second function unit, and the power switching unit 40 can be the same as or similar to those in the first exemplary embodiment.

Referring to FIGS. 5 to 6, the first belt mechanism 20b can include a first belt pulley 202 and a first belt 201 driven by the first belt pulley 202.

The first belt pulley 202 is drivingly connected to the first output gear 430. The first belt pulley 202 is driven by the first output gear 430. For example, the first belt pulley 202 defines a first internal gear (not labeled) on the center of the first belt pulley 202, the first output gear 430 can mesh with the first internal gear.

The first belt mechanism 20b can further include a swinging arm locking cam 203, the swinging arm locking cam 203 being connected to the first locking block 4501.

A second sliding groove 2031 is defined on the swinging arm locking cam 203. The first locking block 4501 includes a first sliding portion 4501c, and the first sliding portion 4501c is slidably received in the second sliding groove 2031.

When the planetary gear 4104 is switched to the first position, the second sliding groove 2031 drives the first locking block 4501 to move down through the first sliding portion 4501c. The first locking surface thereby joins with the second locking surface, and the first locking block 4501 holds the swinging arm 420.

When the planetary gear 4104 is switched from the first position to the second position, the second sliding groove 2031 drives the first locking block 4501 to move up through the first sliding portion 4501c. The first locking surface separates from the second locking surface and the first unlocking surface joins with the second unlocking surface, thus the first locking block 4501 releases the swinging arm 420.

Figure 7:
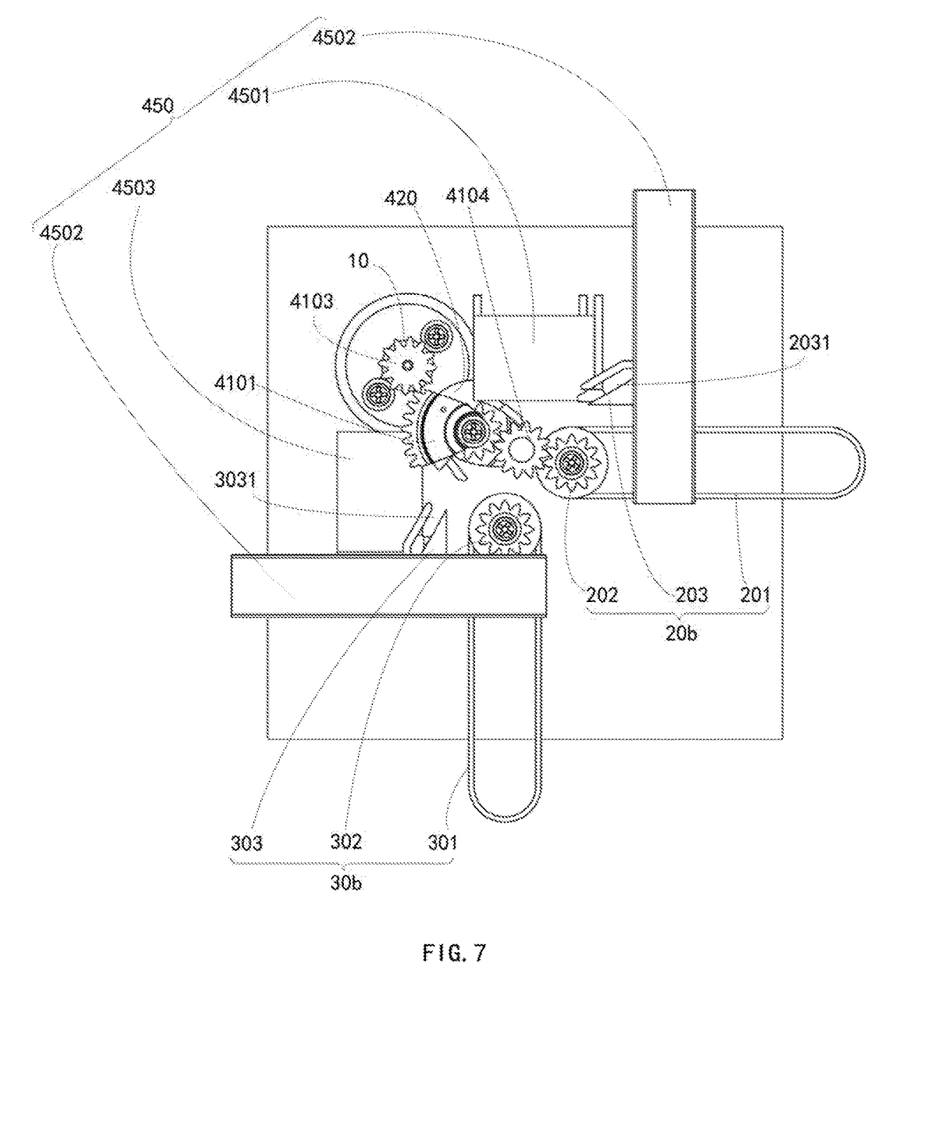
FIG. 7 is an isometric view of a third exemplary embodiment of a switching apparatus for a driving system.

A third exemplary embodiment is presented. The switching apparatus 1 in the third exemplary embodiment is developed from the switching apparatus 1 in the first exemplary embodiment or the switching apparatus 1 in the second exemplary embodiment. The third exemplary embodiment is different in that the second function unit is replaced by a second belt mechanism 30b.

Referring to FIG. 7, the second function unit can be a second belt mechanism 30b.

The second belt mechanism 30b can include a second belt pulley 302 and a second belt 301 driven by the second belt pulley 302.

The second belt pulley 302 is drivingly connected to the second output gear 440. The second belt pulley 302 is driven by the second output gear 440. For example, the second belt pulley 302 defines a second internal gear (not labeled) on the center of the second belt pulley 302, the second output gear 440 can mesh with the second internal gear.

The swinging arm holder 450 further includes a second locking block 4503 driven by the second belt mechanism 30b.

The second locking block 4503 is similar to the first locking block 4501 described above.

The second belt mechanism 30b can further include a second swinging arm locking cam 303, the second swinging arm locking cam 303 being connected to the second locking block 4503.

A fourth sliding groove 3031 is defined on the second swinging arm locking cam 303.

When the motor 10 rotates in a forward direction, the second belt mechanism 30b drives second locking block 4503 to release the swinging arm 420. The third locking path separates from the fourth locking path and the third unlocking path joins with the fourth unlocking path. When the second locking block 4503 releases the swinging arm 420, the swinging arm 420 drives the planetary gear 4104 to the first position, and the first function unit drives the first locking block 4501 to hold the swinging arm 420.

When the motor 10 rotates in a backward direction, the first locking block 4501 releases the swinging arm 420, and the swinging arm 420 drives the planetary gear 4104 to the second position. The second belt mechanism 30b drives the second locking block 4503 to hold the swinging arm 420, and the third locking path joins with the fourth locking path.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A switching apparatus for a driving system, the switching apparatus comprising:
   a motor;
   a first function unit;
   a second function unit; and
   a power switching unit comprising:
      a planetary gear set connected to the motor and driven by the motor; and
      a swinging mechanism connected to the planetary gear set and driven by the planetary gear set, wherein the swinging mechanism comprises a swinging arm;
   wherein the power switching unit is switchable between a first position, where the power switching unit is drivingly connected to the first function unit, and a second position, where the power switching unit is drivingly connected to the second function unit;
   the first function unit is a reciprocation mechanism, the switching apparatus further comprises a swinging arm holder, the swinging arm holder is driven by the first function unit;
   when the motor rotates in a forward direction, the swinging arm is driven to swing in the forward direction, the planetary gear is switched to the first position and the first function unit drives the swinging arm holder to hold the swinging arm;
   when the motor rotates in a backward direction, the first function unit drives the swinging arm holder to release the swinging arm, the swinging arm is driven to swing in the backward direction, the planetary gear is switched to the second position.

2. The switching apparatus of claim 1, wherein the planetary gear set comprises:
   an input gear driven by the motor;
   a driving gear coaxially fixed to the input gear; and
   a planetary gear meshed with the driving gear;
   wherein the driving gear is drivingly connected to the swinging mechanism.

3. The switching apparatus of claim 2, wherein the swinging arm comprises a connecting end connected to the input gear and a free end, the planetary gear is rotatably connected to the free end, the planetary gear meshes with the driving gear;
   when the input gear is driven by the motor, the swinging arm is driven to swing by the input gear, the planetary gear is switched between the first position and the second position.

4. The switching apparatus of claim 3, wherein the power switching unit further comprising:
   a first output gear drivingly connected to the first function unit; and
   a second output gear drivingly connected to the second function unit;
   wherein the first output gear is rotatably mounted to the first position and the second output gear is rotatably mounted to the second position; when the planetary gear is switched to the first position, the planetary gear meshes with the first output gear, when the planetary gear is switched to the second position, the planetary gear meshes with the second output gear.

5. The switching apparatus of claim 4, wherein the swinging arm holder comprises a first locking block defining a first locking path and a first unlocking path; the swinging arm defines a second locking path corresponding to the first locking path and a second unlocking path corresponding to the first unlocking path; the first locking block is driven by the first function unit;
   when the motor rotates in a forward direction, the swinging arm is driven to swing in the forward direction, the planetary gear is switched to the first position, the first function unit drives the first locking path on the first locking block to joint with the second locking path, the first locking block hold the swinging arm;
   when the motor rotates in a backward direction, the first function unit drives the first locking path to separate from the second locking path and the first unlocking path to joint with the second unlocking path, the first locking block release the swinging arm.

6. The switching apparatus of claim 5, wherein the swinging arm is a disk cam, a peripheral surface of the disk cam comprises a first locking surface and a first unlocking surface; a peripheral surface of the first locking block comprises a second locking surface and a second unlocking surface;
   when the motor rotates in a forward direction, the swinging arm is driven to swing in the forward direction, the planetary gear is switched to the first position, the first function unit drives the first locking surface to joint with the second locking surface, the first locking block hold the swinging arm;
   when the motor rotates in a backward direction, the first function unit drives the first locking surface to separate from the second locking surface and the first unlocking surface to joint with the second unlocking surface, the first locking block release the swinging arm.

7. The switching apparatus of claim 6, wherein the first locking surface is on top of the disk cam, the second locking surface is on top of the of the first locking block; the first function unit defines a first sliding groove inclined to moving direction of the first function unit; the first locking block comprises a first sliding portion slidably received in the first sliding groove;

when the planetary gear is switched to the first position, the first sliding groove drives the first locking block to move down through the first sliding portion, the first locking surface joint with the second locking surface, the first locking block hold the swinging arm;

when the planetary gear is switched from the first position to the second position, the first sliding groove drives the first locking block to move up through the first sliding portion, the first locking surface separates from the second locking surface and the first unlocking surface joints with the second unlocking surface, the first locking block releases the swinging arm.

8. The switching apparatus of claim 7, wherein the first function unit comprises:
a first chassis; and
a first rack meshing with the first output gear;
wherein the first sliding groove is defined on the first chassis, the first rack is fixed to the first chassis.

9. The switching apparatus of claim 7, wherein the first function unit comprises:
a first belt pulley drivingly connected to the first output gear;
a first belt driven by the first belt pulley; and
a swinging arm locking cam connected to the first locking block;
wherein a second sliding groove is defined on swinging arm locking cam.

10. The switching apparatus of claim 9, wherein the first belt pulley defines a first internal gear on the center of the first belt pulley, the first output gear meshes with the first internal gear.

11. The switching apparatus of claim 4, wherein the second function unit is an unilateral movement mechanism;
when the motor rotates in the backward direction, the swinging arm is driven to swing in the backward direction, the planetary gear is switched to the second position and held by the second function unit to mesh with the second output gear;
when the motor rotates in the forward direction, the planetary gear is driven to separate from the second output gear and to be switched to the first position.

12. The switching apparatus of claim 4, wherein the second function unit is a reciprocation mechanism, the swinging arm holder further comprises a second locking block driven by the second function unit;
when the motor rotates in a backward direction, the swinging arm is driven to swing in the backward direction, the planetary gear is switched to the second position and the second function unit drives the second locking block to hold the swinging arm;
when the motor rotates in a forward direction, the second function unit drives second locking block to release the swinging arm, the swinging arm is driven to swing in the forward direction, the planetary gear is switched to the first position, when the planetary gear is switched to the first position, the first function unit drives the first locking block to hold the swinging arm.

13. The switching apparatus of claim 12, wherein the second locking block defines a third locking path and a third unlocking path; the swinging arm defines a fourth locking path corresponding to the third locking path and a fourth unlocking path corresponding to the third unlocking path;

when the motor rotates in a forward direction, the second function unit drives second locking block to release the swinging arm, the third locking path separates from the fourth locking path and the third unlocking path joints with the fourth unlocking path, when the second locking block released the swinging arm, the swinging arm drives the planetary gear to be switched to the first position, the first function unit drives the first locking block to hold the swinging arm;

when the motor rotates in a backward direction, the first locking block releases the swinging arm, the swinging arm drives the planetary gear to be switched to the second position, the second function unit drives the second locking block to hold the swinging arm, the third locking path joint with the fourth locking path.

14. The switching apparatus of claim 13, wherein the swinging arm is a disk cam, a peripheral surface of the disk cam comprises a third locking surface and a third unlocking surface; a peripheral surface of the second locking block comprises a fourth locking surface and a fourth unlocking surface;
when the third locking surface joints with the fourth locking surface, the second locking block hold the swinging arm;
when the third locking surface separates from the fourth locking surface and the third unlocking surface joints with the fourth unlocking surface, the second locking block releases the swinging arm.

15. The switching apparatus of claim 14, wherein the third locking surface is on top of the disk cam, the fourth locking surface is on top of the of the second locking block; the second function unit defines a second sliding groove inclined to a moving direction of the second function unit; the second locking block comprises a second sliding portion slidably received in the second sliding groove;
when the planetary gear is switched to the second position, the second sliding groove drives the second locking block to move down through the second sliding portion, the third locking surface joint with the fourth locking surface, the second locking block holds the swinging arm;
when the planetary gear is switched from the second position to the first position, the second sliding groove drives the second locking block to move up through the second sliding portion, the third locking surface separates from the fourth locking surface and the third unlocking surface joints with the fourth unlocking surface, the second locking block releases the swinging arm.

16. The switching apparatus of claim 15, wherein the second function unit comprises:
a second belt pulley drivingly connected to the second output gear;
a second belt driven by the second belt pulley; and
a swinging arm locking cam connected to the second locking block;
wherein the second sliding groove is defined on swinging arm locking cam.

17. The switching apparatus of claim 16, wherein the second belt pulley defines a second internal gear on the center of the second belt pulley, the second output gear meshes with the second internal gear.

* * * * *